United States Patent [19]

Peterson

[11] 4,247,184
[45] Jan. 27, 1981

[54] MAGNETIC INDEXING SYSTEM FOR MICROFILM READER

[75] Inventor: Robert M. Peterson, Hartford, Wis.

[73] Assignee: Bell & Howell Company, Chicago, Ill.

[21] Appl. No.: 33,354

[22] Filed: Apr. 26, 1979

[51] Int. Cl.³ .............................................. G03B 23/08
[52] U.S. Cl. ................................................ 353/27 A
[58] Field of Search ...................... 353/25, 27 R, 27 A, 353/23, 22, 24, 95

[56] References Cited

U.S. PATENT DOCUMENTS 3,868,179   2/1975   Zeutschel ........................ 353/27 R

*Primary Examiner*—Harry N. Haroian
*Attorney, Agent, or Firm*—Alan B. Samlan

[57] ABSTRACT

A microfilm reader with a projection system through which individual images on a piece of microfiche can be projected through a viewing screen. The reader has a base structure on which is mounted a carriage assembly which holds the microfilm and is mounted for horizontal movement relative to the base structure. A series of magnets mounted on the carriage assembly and base structure causes the carriage assembly to be magnetically held in predetermined positions. In one embodiment the predetermined magnetically held positions are identical to the distances between the individual images on the microfiche whereby images from the microfiche can be precisely positioned on the screen without the operator viewing the image on the screen.

7 Claims, 5 Drawing Figures

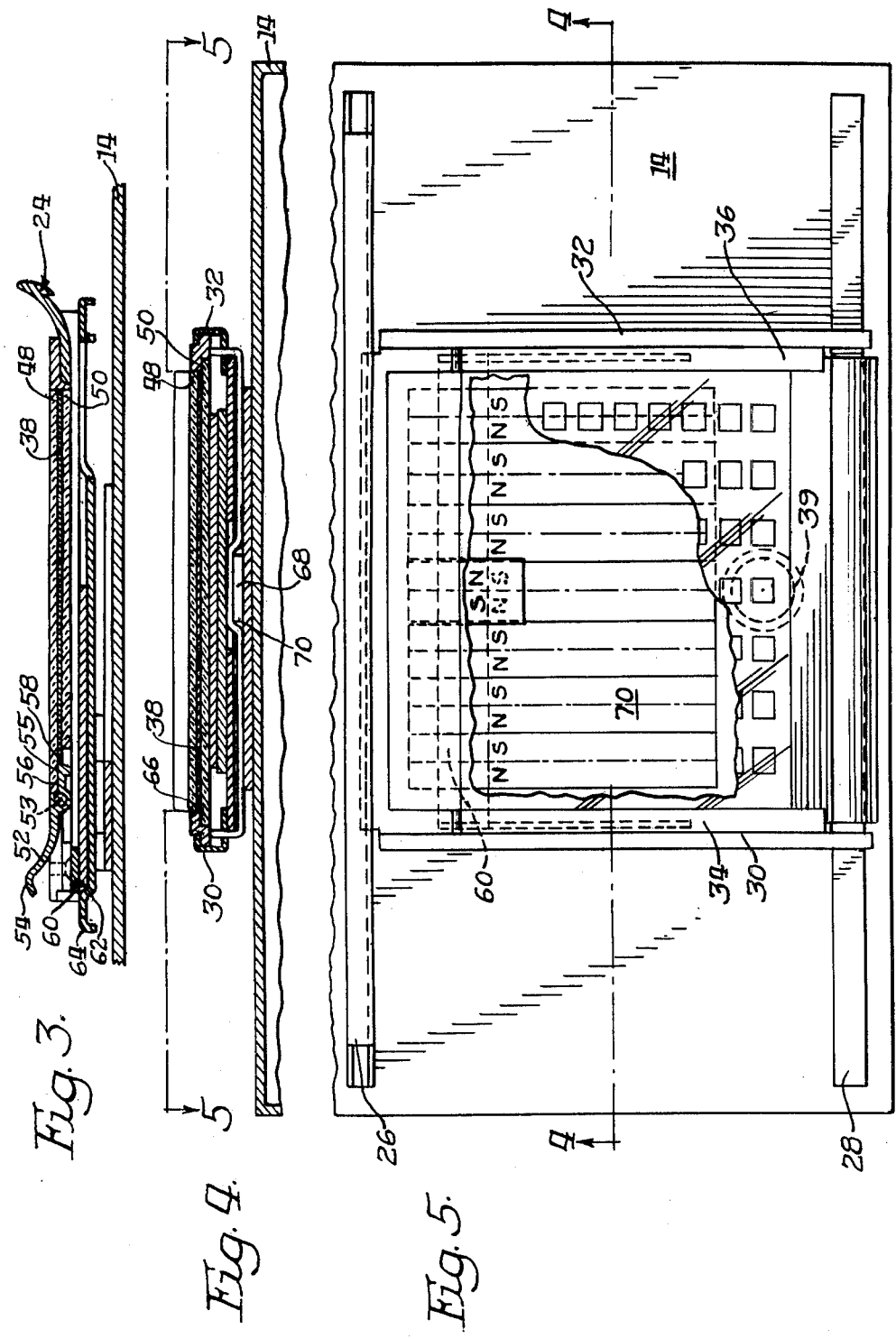

MAGNETIC INDEXING SYSTEM FOR MICROFILM READER

BACKGROUND OF THE INVENTION

This invention relates to microfilm readers and more particularly to microfilm readers having a carriage assembly which can be precisely indexed and held in predetermined positions.

A microfiche is usually a small piece of film, approximately 4 inches by 6 inches, having a plurality of images photographed thereon in an orthogonal array. To view the images, it is necessary for the fiche to be placed within a fiche carriage and moved about orthogonally relative to an optical system to project the desired image on the film to a screen.

Microfilm readers normally project an image to a viewing screen in one of two manners. The first is to project an image on to an opaque viewing screen and view the image from the front of the screen. This is called a front projection screen and one example is illustrated in U.S. Pat. No. 4,130,352. The second method is through the use of a rear projection screen which is a translucent piece of plastic having optical characteristics which intercept the projected image and display it on the opposite side of the screen. Thus, the image is not viewed from the side of the screen from which it is projected, but rather from the opposite side of the projection system. An example of this is illustrated in U.S. Pat. No. 4,050,799.

The fiche carriage generally moves about freely so that individual images can be placed in the projection system. With microfilm gaining greater acceptability and wider usage it has become a method of distributing varied types of information. For example, sales people can carry a portable microfilm reader into a customer's location and give a complete presentation utilizing relatively few microfiche. Some microfilm viewers are designed as rear projection units with the person giving the presentation and controlling the fiche carriage on one side of the viewing screen (projection side) while the customer or viewer is on the opposite side (viewing side) of the screen. The operator of the fiche carriage might not be able to see the images which are being projected on to the screen without peering around the corner of the screen to see the images. This becomes a nuisance when trying to give a sales talk coordinated with microfilm. The person giving the presentation knows the location of the desired specific images on the microfiche. If the microfiche can be accurately positioned on the fiche carriage and the fiche carriage has the capability to be precisely incrementally moved, then there would be no need for the operator to look around at the screen and see the image that is being projected and its position. The operator would already know that the image is accurately positioned in the projection path and on the screen. Different images could easily be presented by incrementally moving the carriage to a different held position.

Therefore, it is an object of the present invention to provide a microfilm reader having a carriage assembly which can accurately and precisely be held in predetermined positions as it moves orthogonally on the microfilm viewer.

Another object of the invention is to provide a carriage assembly having magnetic means to magnetically hold the carriage assembly in precise and accurate positions such that a desired image on the microfilm is displayed on the viewing screen. A further object is to provide a microfiche carriage indexing system which is subject to a minimum amount of wear and is also economical to manufacture.

SUMMARY OF THE INVENTION

According to the principles of this invention, a microfilm viewer has a carriage assembly mounted to a base structure for horizontal orthogonal movement. The carriage assembly holds a piece of microfiche which has individual images arranged in rows and columns thereon. The microfilm viewer has a projection system which projects a beam of light through the microfiche, into a lens and mirror system and then onto a viewing screen.

The carriage assembly has one or more magnets mounted to its base. A corresponding series of magnets is mounted to the microfilm reader such that the magnets on the bottom of the carriage assembly are in close proximity and above the magnets on the reader. The number of magnets which make up the series is equal to the number of columns of images on the microfiche. The series of magnets on the reader have identical spacing to the distance between the images on the microfiche. The poles of the magnets on the carriage attract opposite magnetic poles on the microfilm reader. This causes the carriage to be held or "latch" where the fields are strongest.

A similar arrangement is constructed whereby series of magnets in rows are placed on one part of the carriage assembly with alternate poles adjacent to each other. A magnet is then placed on another part of the carriage assembly which slides in close proximity relative to the first part of the carriage assembly. The spacing in this series of magnets is identical to the spacing between the rows of images on the microfiche.

A matrix of magnetically held or latched positions is created which is identical to the matrix of images on the microfiche. Thus, individual images of the microfiche can be placed in the light projection system and accurately aligned for display on the screen.

BRIEF DESCRIPTIONS OF THE DRAWINGS

The foregoing, features and advantages of the invention will be apparent from the following description of a preferred embodiment of the invention, as illustrated in the accompanying drawings wherein:

FIG. 3 is a cross sectional view taken along line 3—3 of FIG. 2;

FIG. 4 is a cross sectional view taken along line 4—4 of FIG. 5;

FIG. 5 is a cross sectional view with portions removed and taken along line 5—5 of FIG. 4.

DESCRIPTION OF THE PREFERRED EMBODIMENT

Figure 1:
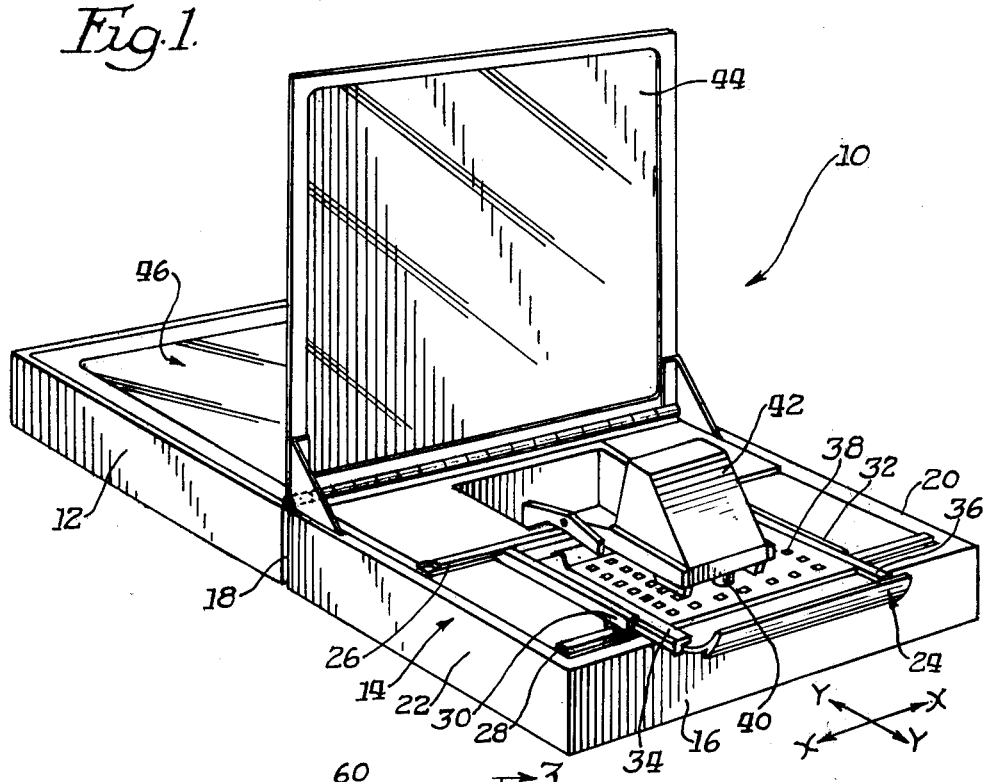
FIG. 1 is a perspective view of a microfilm reader with a rear projection screen in the projection position.

Turning first to FIG. 1 there is illustrated a microfilm reader 10 having a top hinged cover 12 and a base structure 14. The base structure 14 has a front portion 16, rear portion 18, and opposite side portions 20, 22.

The base structure 14 has mounted on its top a fiche carriage 24 which allows orthogonal movement in the horizontal plane relative to the top of base structure 14.

Slide rails 26, 28 allow the fiche carriage 24 to move in the direction indicated as X—X in FIG. 1. Silde rails 30, 32 retain frame members 34, 36 of the fiche carriage 24 and allow movement in the direction indicated by arrow Y—Y of FIG. 1. Thus, the fiche carriage 24 can position any of the images on a piece of fiche 38 in the projection system of the microfilm reader 10.

One projection system has a light source in the base structure 14 (not illustrated) which projects a beam of light up through a hole 39 (FIG. 5) in the base structure 14, through the image on the fiche 38 and into a lens 40. The image is reflected and magnified by mirrors and lenses in projection means 42 and then displayed on a screen 44. If the screen is a rear projection screen, i.e. a screen designed for having the image projected on the rear of the screen and then viewed from the front side, then the person viewing the image would be looking at the screen in FIG. 1 from the side opposite the projection means 42. This would allow the operator of the microfilm reader 10 to be located on the side of the screen where the fiche carriage 24 is positioned so that he could move the fiche carriage 24 while facing and talking to the viewer of the images from the carriage side of the screen.

Alternatively, the screen 44 could be removed, and the top structure 12 raised into a vertical position, and the top cover 12 could have an internal screen 46 suitable for front projection use. Then both the operator and viewer would be on the same (carriage) side of the microfilm reader 10, both being able to view the image on the screen 45 simultaneously. A difficulty which arises when using a rear projection screen is that the operator of the fiche carriage 24 would see all images in reverse if he could see the screen 44 only from the carriage side. In some instances the microfilm reader 10 is constructed such that the operator can not even see the screen. Thus, the operator cannot accurately position an image on the screen for viewing unless he peers around the corner of the screen or comes around to the same side that the viewing person is on. Obviously in a sales presentation both of these situations are quite undesirable.

Applicant's solution was to have the fiche carriage 24 held in precise locations along its X and Y direction of movement. The images on the fiche can then be projected in precise position on the screen 44.

Figure 2:
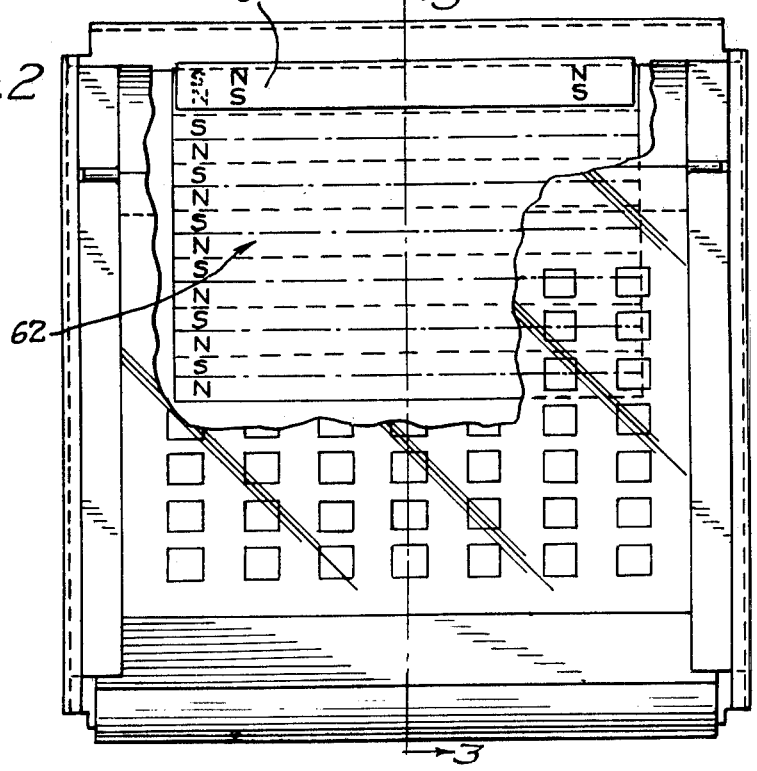
FIG. 2 is an enlarged plan view with portions removed of the microfiche carriage assembly.

FIGS. 2 and 3 illustrate the means by which Applicant achieves accurate positioning and holding of the fiche carriage 24 in the Y direction. The fiche 38 is held between glass flats 48, 50. A lever arm 52 having an upper end 54 is pushed downward causing the lever arm 52 to pivot about pivot point 53 causing a lower end 55 to raise. There is a shelf 56 on the lower end 55 which has the upper glass flat 48 cemented to it. Thus, as the upper end 54 of the lever arm 52 is pushed down, the upper glass flat 48 is raised. The fiche 38 can then be inserted between the glass flats 48 and 50. The fiche 38 should be inserted until its edge strikes registration point 58 on the lower end 55. This insures the fiche 38 being inserted to the same exact location each time a new piece of fiche is to be viewed.

A first magnetic means 60 is mounted to the fiche carriage 24 just below the lever arm 52. The first magnetic means can be a magnetic strip having one or more magnetic poles. Beneath the first magnetic means 60 is a second magnetic means 62 mounted to a stationary part 64 of the fiche carriage 24. The second magnetic means 62 is made up of a series of magnets having alternate magnetic poles placed next to each other. The second magnetic means 62 is mounted on a stationary part 64 of the fiche carriage 24 so that the associated magnetic poles of the second magnetic means become fixed reference points. The opposite poles between the first and second magnetic means attract each other. As the fiche carriage is moved in the Y direction the fiche carriage will "latch" or be magnetically held at the point or points of greatest magnetic attraction. As seen in FIG. 2, there would be seven such points where the opposite polar magnetic attraction will be greatest. At positions where the first and second magnetic means have like poles adjacent each other, there will be repulsion which will tend to push the fiche carriage towards one of the magnetically held positions.

Movement of the fiche carriage 24 in the X direction is most clearly illustrated in FIGS. 4 and 5. When the fiche is inserted between the glass flats 48 and 50, it must not only be in contact with the registration point 58 but must also be positioned in the X direction on the glass flats with a side registration point illustrated in FIG. 4 as stop 66. This insures that the fiche 38 is placed at the same position relative to the glass flats and carriage assembly 24 each time.

A third magnetic means 68 is cemented or secured by other known means to the bottom of the fiche carriage 24. This is similar to the first magnetic means 60 in that one or two magnetic poles are sufficient. A fourth magnetic means 70 is secured to the top of the base structure 14. The fourth magnetic means 70 is similar to the second magnetic means 62 in that it is composed of a series of magnets having alternate magnetic poles adjacent each other. Thus, the firmly attached fourth magnetic means 70 provides fixed polar reference points for the third magnetic means as it slides in the X direction across the base structure 14. As seen in FIG. 5, there are seven positions where the third magnetic means 68 will have the greatest magnetic attraction for the poles of the fourth magnetic means 70.

The magnetically held or latched positions of the fiche carriage 24 will be useful only if the images on the fiche 38 are accurately positioned. The fiche must be made with accurate image placement in both the X and Y directions. The placement of the images must also be uniform from fiche to fiche so that the image will be properly positioned in the image projection system when the carriage assembly 24 is in one of its magnetically held positions.

If the distance between images in the X direction on the fiche is three quarters of an inch, then the distance between like poles on the fourth magnetic means should also be three quarters of an inch. Likewise, the spacing between images in the Y direction on the microfiche should be identical to the spacing between like poles of the second magnetic means 62.

FIG. 5 illustrates an image placed above the hole 39 in line with the projection beam of light. As the fiche carriage 24 is indexed in the X or Y direction other images will be placed above the hole 39. In designing the system one must be careful that the size of any of the moving magnetic means 60, 68 will never cover the hole 39 cutting off the projection beam when the carriage is moved to any of its extreme positions.

A magnetic tape which has been found to be quite satisfactory in its design characteristics for providing the magnetic poles is manufactured by Bunting Magnetics Company in Elk Grove Village, Ill. Another company which manufactures a magnet tape is Scotch ® brand self-sticking magnet tape manufactured by 3-M Company, St. Paul, Minn. These companies produce magnetic strips of varying widths which can be cut to desired lengths. The tape has a self-sticking back for easy application.

Thus it is apparent that there has been provided, in accordance with the invention, a microfilm viewer with a magnetic indexing carriage that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A microfilm reader comprising:
   a base structure having front, back, and opposite side portions,
   a carriage assembly for holding a piece of microfiche thereon, the microfiche having individual images arranged orthogonally in rows and columns,
   the base structure having means to project a beam of light through individual images on the microfiche to a viewing screen,
   the carriage assembly mounted for horizontal movement relative to the base structure,
   first magnetic means mounted on the base structure and second magnetic means mounted on the carriage assembly, each magnetic means having at least one magnetic pole opposite to a magnetic pole of the other, the magnetic means mounted on the carriage assembly in close proximity to the magnetic means mounted on the base structure such that the magnetic forces between the first and second magnetic means causes the carriage assembly to be magnetically held in predetermined positions.

2. The microfilm reader of claim 1 wherein the alternate magnetic poles are placed adjacent each other from side to side and the number of alternating magnetic poles is equal to the number of columns of images on the fiche thereby resulting in the number of carriage held positions in side to side movement of the carriage being identical to the number of columns of images on the fiche.

3. A microfilm reader comprising:
   a base structure having front, back, and opposite side portions,
   a carriage assembly for holding a piece of microfiche thereon, the microfiche having individual images arranged orthogonally in rows and columns,
   the base structure having means to project a beam of light through individual images on the microfiche to a viewing screen,
   the carriage assembly having at least two movable members, both members movable horizontally relative to the base structure and also movable horizontally with respect to each other,
   first magnetic means mounted on one of the movable members and second magnetic means mounted on the other movable member, each magnetic means having at least one magnetic pole opposite to a magnetic pole of the other, the magnetic means mounted on the movable members in close proximity to each other such that the magnetic forces between the first and second magnetic means causes the carriage assembly to be magnetically held in predetermined positions.

4. The microfilm reader of claim 1 or 3 wherein one of the magnetic means is a coplanar series of magnets placed adjacent each other with alternating magnetic poles next to each other and the other magnetic means is at least one magnetic pole, whereby the carriage assembly is magnetically held in any one of a series of positions where the magnetic attraction between opposite polar magnetic means is greatest, and the distance between positions is determined by the distance between the individual magnets in the series of magnets.

5. The microfilm reader of claim 3 wherein the alternating magnetic poles are placed adjacent each other from front to back and the number of alternating magnetic poles is equal to the number of rows of images on the fiche thereby resulting in the number of carriage held positions in front to back movement of the carriage being identical to the number of rows of images on the fiche.

6. A microfilm reader comprising:
   a base structure having front, back, and opposite side portions,
   a carriage assembly for holding a piece of microfiche thereon,
   the microfiche having individual images arranged orthogonally in rows and columns,
   the base structure having means to project a beam of light through individual images on the microfiche to a viewing screen,
   the carriage assembly mounted for horizontal movement relative to the base structure,
   first magnetic means mounted on the base structure,
   second magnetic means having at least one magnetic pole opposite to a magnetic pole of the first magnetic means and mounted on the carriage assembly above the first magnetic means,
   the first or second magnetic means being a coplanar series of magnets placed next to each other from side to side relative to the base structure and placed adjacent each other with alternating magnetic poles,
   third magnetic means mounted on the carriage assembly,
   fourth magnetic means on a separate moveable part of the carriage assembly on which the third magnetic means are mounted,
   the third or fourth magnetic means being a coplanar series of magnets placed adjacent each other from front to back relative to the base structure, with alternating magnetic poles next to each other,
   whereby the carriage assembly is magnetically held in any one of a series of positions where magnetic attraction between opposite polar magnetic means is greatest, and the distance between held positions is determined by the distance between the individual magnets in the series of magnets.

7. The microfilm reader of claim 6 wherein the magnetically held positions are a matrix identical to the position of the individual images arranged orthogonally on the microfiche.

* * * * *